(12) United States Patent
Diab et al.

(10) Patent No.: US 9,014,248 B2
(45) Date of Patent: Apr. 21, 2015

(54) BASE-T COMMON MODE TESTING IN AN ETHERNET SUBSYSTEM

(71) Applicant: Broadcom Corporation, Irvine, CA (US)

(72) Inventors: Wael William Diab, San Francisco, CA (US); William Bliss, Granite Canyon, WY (US)

(73) Assignee: Broadcom Corporation, Irvine, CA (US)

( * ) Notice: Subject to any disclaimer, the term of this patent is extended or adjusted under 35 U.S.C. 154(b) by 17 days.

(21) Appl. No.: 13/755,870

(22) Filed: Jan. 31, 2013

(65) Prior Publication Data

US 2014/0211832 A1   Jul. 31, 2014

(51) Int. Cl.
*H04B 17/00* (2006.01)
*H04L 25/02* (2006.01)
*H04B 3/30* (2006.01)
*H04B 3/46* (2006.01)

(52) U.S. Cl.
CPC ........ *H04L 25/0266* (2013.01); *H04L 25/0272* (2013.01); *H04B 3/30* (2013.01); *H04B 3/46* (2013.01)

(58) Field of Classification Search
CPC . H04L 25/0266; H04L 25/0272; H04L 25/03; H04B 3/30; H04B 3/46
USPC .................. 375/219, 224, 227, 257, 258, 295
See application file for complete search history.

(56) References Cited

U.S. PATENT DOCUMENTS

| | | | | |
|---|---|---|---|---|
| 7,457,252 | B2 * | 11/2008 | Karam et al. | 370/252 |
| 2006/0115007 | A1 * | 6/2006 | Karam et al. | 375/257 |
| 2008/0062590 | A1 * | 3/2008 | Karam | 361/42 |
| 2011/0292977 | A1 * | 12/2011 | Farjadrad | 375/220 |
| 2013/0286864 | A1 * | 10/2013 | Karam | 370/252 |

* cited by examiner

*Primary Examiner* — Leon Flores
(74) *Attorney, Agent, or Firm* — Sterne, Kessler, Goldstein & Fox PLLC (57) ABSTRACT

Systems and methods are provided for common mode testing for a system using an Ethernet subsystem. The Ethernet subsystem generates test signals that can be introduced at various points in the system to detect the effect of noise introduced by various elements of the system. By introducing test signals at various points in a system, common mode noise introduced into the system can be more accurately determined.

21 Claims, 7 Drawing Sheets

BASE-T COMMON MODE TESTING IN AN ETHERNET SUBSYSTEM

FIELD OF THE INVENTION

This invention relates to Ethernet communications and more specifically to noise detection using an Ethernet subsystem.

BACKGROUND

A variety of Ethernet standards exist to govern computer networking technologies. For example, 10 gigabit Ethernet (10GE) is a networking standard for Ethernet with a data rate of 10 gigabits per second. 10GBASE-T is a networking standard for 10 gigabit Ethernet over a conductor pair (e.g., a twisted pair cable). LOGE and 10GBASE-T are ten times faster than normal Ethernet. Future Ethernet standards will likely govern faster communications. For example, a 40GBASE-T standard may be used to govern 40 gigabit Ethernet over a conductor pair, such as a twisted pair cable.

In twisted pair communications, differential signaling is used to transmit information with two complementary signals sent on the two conductors, referred to as a differential signal. One component of the differential signal can be subtracted from the other component of the differential signal to eliminate common mode noise. Often times, physical characteristics of BASE-T systems, such as connectors used to couple devices in the BASE-T system or transformers used to isolate transceivers of the devices in the BASE-T system from the conductor pairs to provide some examples, preclude the differential signals from completely eliminating the common mode noise when subtracted. For example, noise within a first component of the differential signal can slightly be offset in phase and/or amplitude from the noise within a second component of the differential signal. As a result, the first noise is not completely subtracted from the second noise, thereby leaving common mode noise within the BASE-T system. This common mode noise is converted into differential mode noise as the BASE-T system converts the differential signals into a single mode signal. Although this common mode noise and/or differential mode noise has little impact on BASE-T systems with lower speeds, BASE-T systems with higher speeds (e.g., 10 gigabits per second and above) are more sensitive to noise.

BRIEF DESCRIPTION OF THE DRAWINGS/FIGURES

The accompanying drawings, which are incorporated in and constitute part of the specification, illustrate embodiments of the disclosure and, together with the general description given above and the detailed descriptions of embodiments given below, serve to explain the principles of the present disclosure. In the drawings.

Features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

In the following description, numerous specific details are set forth to provide a thorough understanding of the disclosure. However, it will be apparent to those skilled in the art that the disclosure, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

1. Overview

Embodiments of the present disclosure detect common mode noise and/or differential noise generated within an Ethernet system using various test signals. The Ethernet system can be implemented as a Power over Ethernet (PoE) system. The Ethernet system generates test signals that can be introduced at various points in the Ethernet system to detect the effect of noise introduced by various components within the Ethernet system. By introducing test signals at various points in the Ethernet system and analyzing various outputs of the various components, the common mode noise and/or differential noise introduced into the Ethernet system can be more accurately determined.

2. Conventional Power Over Ethernet Systems

Ethernet communications provide high speed data communications over a communications link between two communications nodes that operate according the IEEE 802.3 Ethernet Standard. The communication medium between the two nodes can be twisted pair wires for Ethernet or another type of communications medium. Power over Ethernet (PoE) communication systems provide power and data communications over a common communications link. More specifically, a power source device (PSE) connected to the physical layer (PHY) of the first node of the communications link provides DC power (for example, 48 volts DC) to a powered device (PD) at the second node of the communications link. The DC power is transmitted simultaneously over the same communications medium with the high speed data from one node to the other node.

The PSE typically includes a controller that controls the DC power provided to the PD at the second node of the communications link. The PSE controller measures the voltage, current, and temperature of the outgoing and incoming DC supply lines to characterize the power requirements of the PD. In addition, the PSE controller may detect and validate a compatible PD, determine a power classification signature for the validated PD, supply power to the PD, monitor the power, and reduce or remove the power from the PD when the power is no longer requested or required. During detection, if the PSE finds the PD to be non-compatible, the PSE can prevent the application of power to that PD device, protecting the PD from possible damage.

Figure 1:
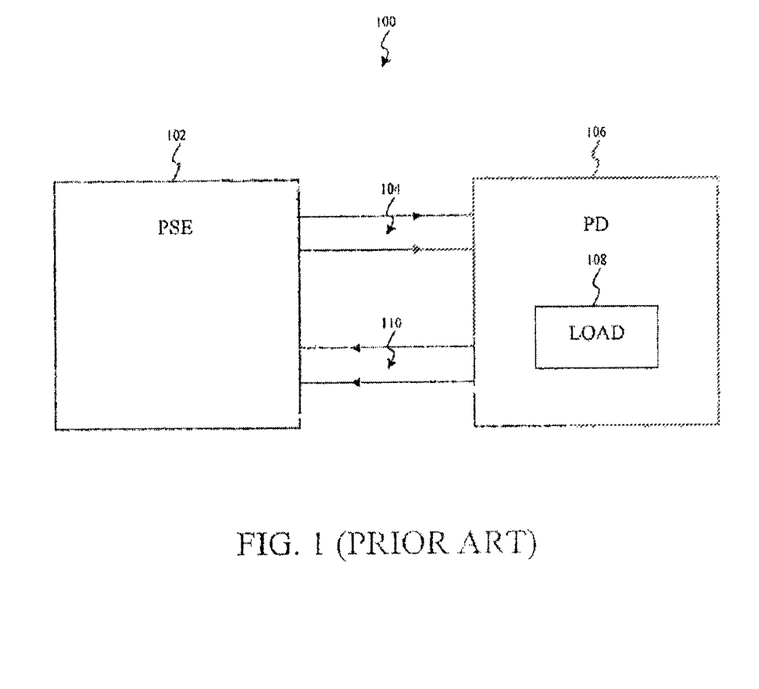
FIG. 1 is a block diagram of a conventional Power over Ethernet (PoE) system.

Conventional PoE systems will now be described with reference to FIGS. 1 and 2. FIG. 1 illustrates a high level diagram of a conventional Power over Ethernet (PoE) subsystem 100 that provides both DC power and data communications over a common data communications medium. PoE subsystem 100 can communicate with the power source equipment (PSE) 102 and the powered device (PD) 106 using a variety of mechanisms (e.g., using L2 packets, etc.). The PSE 102 and the PD 106 can also communicate with each other via Ethernet, higher layer packets, protocol over PoE subsystem 100 (e.g., modulating the voltage) and/or any other method. Referring to FIG. 1, the PSE 102 provides DC power over conductors 104, 110 to the PD 106 having a representative electrical load 108. The PSE 102 and PD 106 also include data transceivers that operate according to a known communications standard, such as the IEEE Ethernet standard. More specifically, the PSE 102 includes a physical layer device on the PSE side that transmits and receives high speed data with a corresponding physical layer device in the PD 106, as will be discussed further below. Accordingly, the power transfer between the PSE 102 and the PD 106 occurs simultaneously with the exchange of high speed data over the conductors 104, 110. In one example, the PSE 102 is a data switch having multiple ports that is communication with one or more PD devices, such as Internet phones, or a wireless access point.

The conductor pairs 104 and 110 can carry high speed differential data communications. In one example, the conductor pairs 104 and 110 each include one or more twisted wire pairs, or any other type of cable or communications media capable of carrying the data transmissions and DC power transmissions between the PSE and PD. In Ethernet communications, the conductor pairs 104 and 110 can include multiple twisted pairs, for example four twisted pairs for 10 Gigabit Ethernet. In 10/100 Ethernet, only two of the four pairs carry data communications, and the other two pairs of conductors are unused. Herein, conductor pairs may be referred to as Ethernet cables or communication links for ease of discussion.

Figure 2:
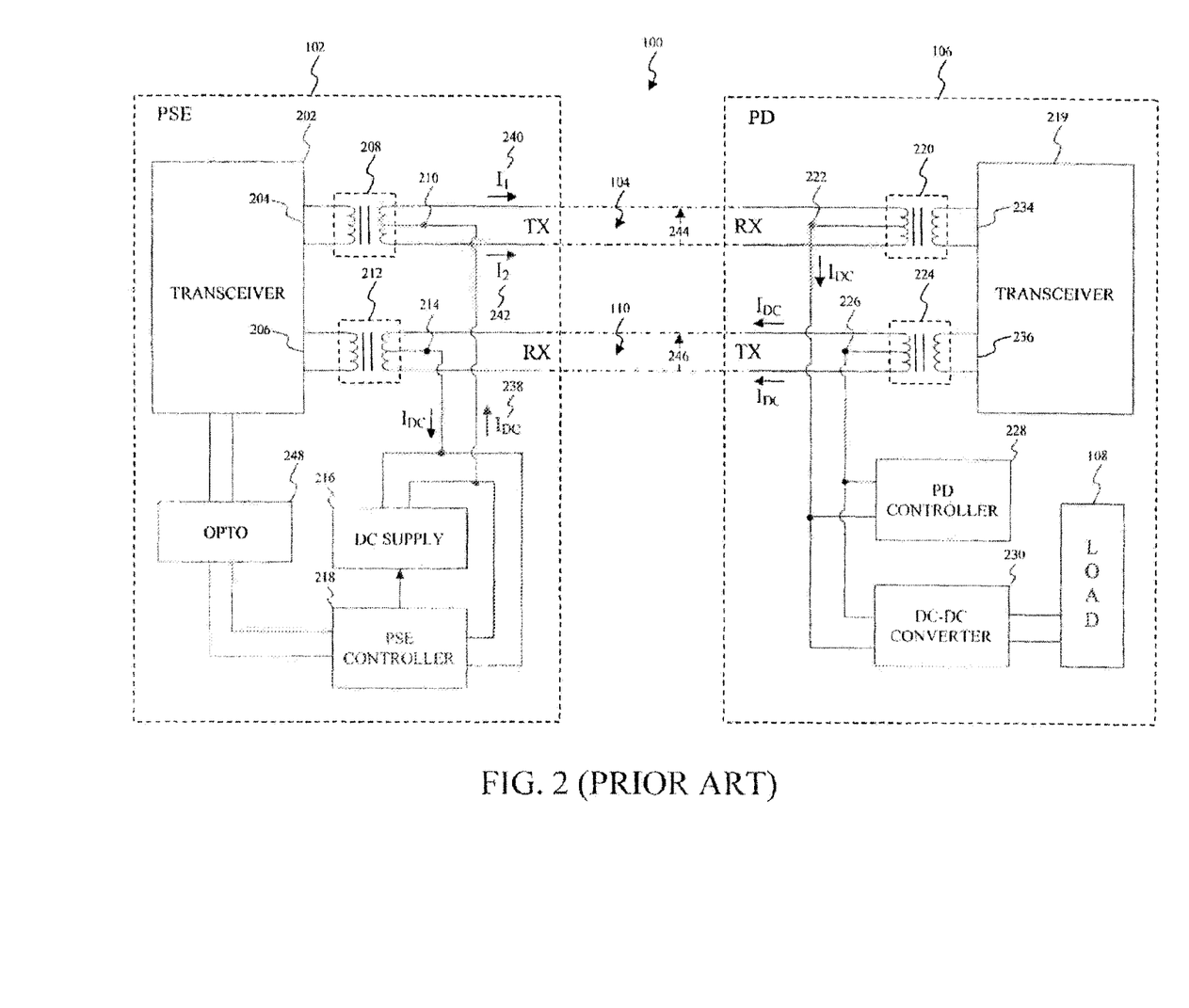
FIG. 2 illustrates a more detailed figure of the conventional power transfer from the Power Source Equipment (PSE) to the Powered Device (PD) in a conventional PoE communications system.

FIG. 2 provides a more detailed circuit diagram of the PoE subsystem 100, where PSE 102 provides DC power to PD 106 over conductor pairs 104 and 110. PSE 102 includes a transceiver physical layer device (PHY) 202 (herein, transceivers may be referred to as PHYs) having full duplex transmit and receive capability through differential transmit port 204 and differential receive port 206. It should be understood that transceivers operating in embodiments of the present disclosure may or may not support Energy-Efficient Ethernet (EEE) capability. A first transformer 208 couples high speed data between the transmit port 204 and the first conductor pair 104. Likewise, a second transformer 212 couples high speed data between the receive port 206 and the second conductor pair 110. The respective transformers 208 and 212 pass the high speed data to and from the transceiver 202, but isolate any low frequency or DC voltage from the transceiver ports, which may be sensitive large voltage values.

The first transformer 208 includes primary and secondary windings, where the secondary winding (on the conductor side) includes a center tap 210. Likewise, the second transformer 212 includes primary and secondary windings, where the secondary winding (on the conductor side) includes a center tap 214. The DC voltage supply 216 generates an output voltage that is applied across the respective center taps of the transformers 208 and 210 on the conductor side of the transformers. The center tap 210 is connected to a first output of a DC voltage supply 216, and the center tap 214 is connected to a second output of the DC voltage supply 216. As such, the transformers 208 and 212 isolate the DC voltage from the DC supply 216 from the sensitive data ports 204, 206 of the transceiver 202. An example DC output voltage is 48 volts, but other voltages could be used depending on the voltage/power requirements of the PD 106.

The PSE 102 further includes a PSE controller 218 that controls the DC voltage supply 216 based on the dynamic needs of the PD 106. PSE controller 218 is coupled to an isolator 248. More specifically, the PSE controller 218 measures the voltage, current, and temperature of the outgoing and incoming DC supply lines so as to characterize the power requirements of the PD 106.

Further, the PSE controller 218 detects and validates a compatible PD, determines a power classification signature for the validated PD, supplies power to the PD, monitors the power, and reduces or removes the power from the PD when the power is no longer requested or required. During detection, if the PSE finds the PD to be non-compatible, the PSE can prevent the application of power to that PD device, protecting the PD from possible damage. IEEE has imposed standards on the detection, power classification, and monitoring of a PD by a PSE in the IEEE 802.3af™ standard, which is incorporated herein by reference.

Still referring to FIG. 2, the contents and functionality of the PD 106 will now be discussed. The PD 106 includes a transceiver physical layer device 219 having full duplex transmit and receive capability through differential transmit port 236 and differential receive port 234. A third transformer 220 couples high speed data between the first conductor pair 104 and the receive port 234. Likewise, a fourth transformer 224 couples high speed data between the transmit port 236 and the second conductor pair 110. The respective transformers 220 and 224 pass the high speed data to and from the transceiver 219, but isolate any low frequency or DC voltage from the sensitive transceiver data ports.

The third transformer 220 includes primary and secondary windings, where the secondary winding (on the conductor side) includes a center tap 222. Likewise, the fourth transformer 224 includes primary and secondary windings, where the secondary winding (on the conductor side) includes a center tap 226. The center taps 222 and 226 supply the DC power carried over conductors 104 and 110 to the representative load 108 of the PD 106, where the load 108 represents the dynamic power draw needed to operate PD 106. A DC-DC converter 230 may be optionally inserted before the load 108 to step down the voltage as necessary to meet the voltage requirements of the PD 106. Further, multiple DC-DC converters 230 may be arrayed in parallel to output multiple different voltages (3 volts, 5 volts, 12 volts) to supply different loads 108 of the PD 106.

The PD 106 further includes a PD controller 228 that monitors the voltage and current on the PD side of the PoE configuration. The PD controller 228 further provides the necessary impedance signatures on the return conductor 110 during initialization, so that the PSE controller 218 will recognize the PD as a valid PoE device, and be able to classify its power requirements.

During ideal operation, a direct current ($I_{DC}$) 238 flows from the DC power supply 216 through the first center tap 210, and divides into a first current ($I_1$) 240 and a second current ($I_2$) 242 that is carried over conductor pair 104. The first current ($I_1$) 240 and the second current ($I_2$) 242 then recombine at the third center tap 222 to reform the direct current ($I_{DC}$) 238 so as to power PD 106. On return, the direct current ($I_{DC}$) 238 flows from PD 106 through the fourth center tap 226, and divides for transport over conductor pair 110. The return DC current recombines at the second center tap 214, and returns to the DC power supply 216. As discussed above, data transmission between the PSE 102 and the PD 106 occurs simultaneously with the DC power supply described above. Accordingly, a first communication signal 244 and/or a second communication signal 246 are simultaneously differentially carried via the conductor pairs 104 and 110 between the PSE 102 and the PD 106. It important to note that the communication signals 244 and 246 are differential signals that ideally are not affected by the DC power transfer.

3. Common Mode Testing Using a PoE Subsystem

Figure 3A:
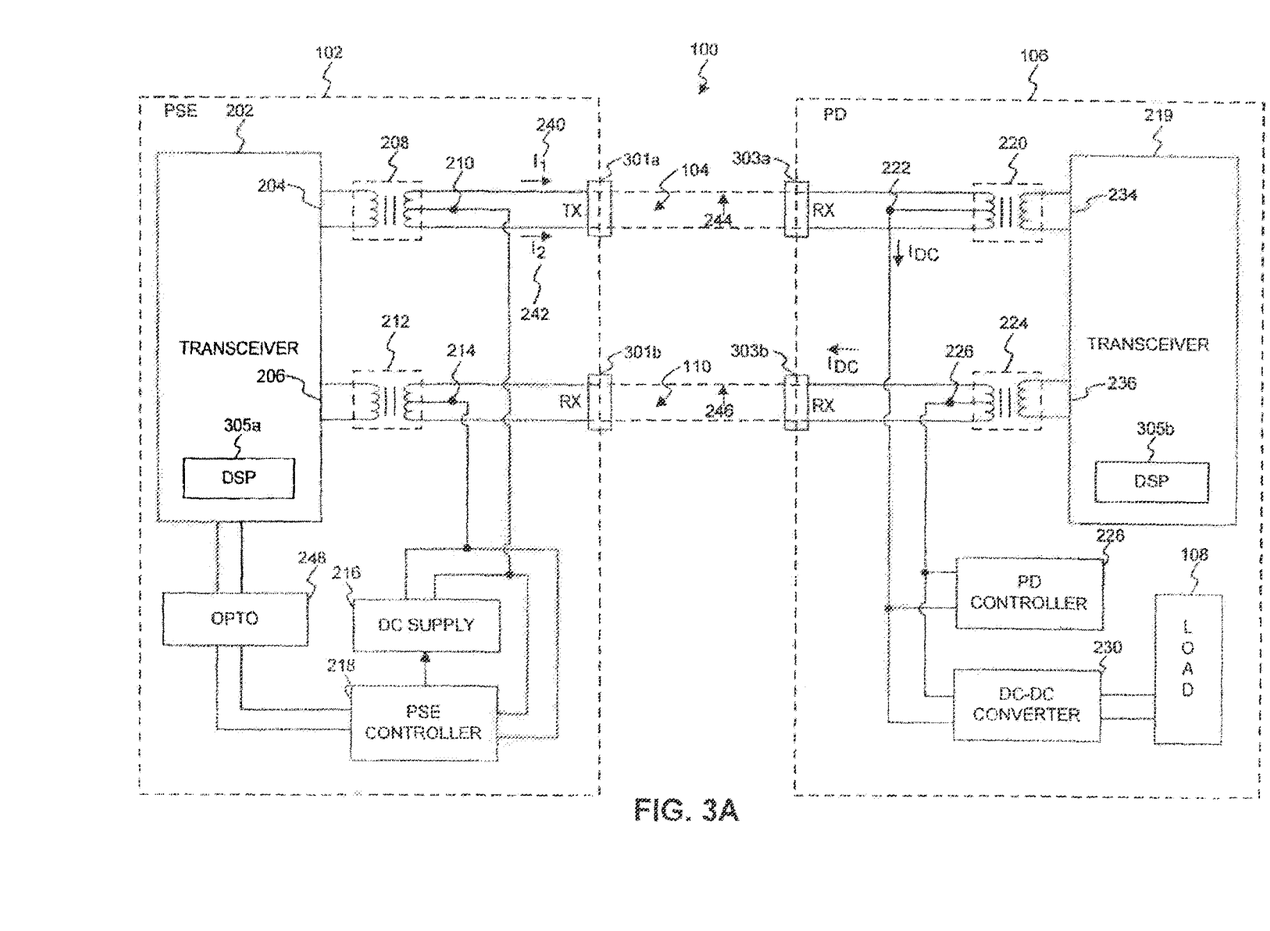
FIG. 3A is a block diagram of a PoE communications system configured to generate test signals in accordance with an embodiment of the present disclosure.

FIG. 3A is a block diagram of a PoE communications system configured to generate test signals in accordance with an embodiment of the present disclosure. FIG. 3A shows connector 301a and connector 301b (herein connectors 301) used to couple conductors 104 and 110, respectively, to PSE 102 and connectors 303a and 303b (herein connectors 303b) used to couple conductors 104 and 110, respectively, to PD 106. In FIG. 3A, transceivers 202 and 219, PSE controller 218, and PD controller 228 are configured to generate and/or detect test signals to accurately detect and/or correct for common mode and/or differential noise using various test points. For example, a signal (and/or a signal communicating an observation of a test signal) can become degraded as it passes through transformers 208, 212, 220, and/or 224 and/or as it passes through connectors 301 and/or 303. By introducing and analyzing test signals at various points in PoE subsystem 100, the noise introduced by connectors 301 and/or 303 and/or transformers 208, 212, 220, and/or 224 can be determined.

In an embodiment, digital signal processing module 305a is configured to generate a test signal. The test signal can be an impulse signal, a predetermined test pattern, or any other suitable signal that will be apparent to those skilled in the relevant art(s) without departing from the spirit and scope of the present disclosure. The test signal passes through isolator 248, PSE controller 218, and the DC supply 216 onto center tap 210 and/or 214, where it is routed throughout the PoE subsystem 100. Alternatively, or in addition to this example, the test signal can be generated by PSE controller 218 and can pass through the DC supply 216 onto center tap 210 and/or 214, where it is routed throughout the PoE subsystem 100. This test signal, whether generated by DSP module 305a or PSE controller 218, can be used to detect noise introduced by transformer 208 and/or transformer 212 onto the test signal.

The DSP module 305a can detect the output of the test signal from transformer 208 and/or 212 and can analyze it to determine how transformer 208 and/or 210 altered the test signal. Because the original test signal can be known in advance by DSP module 305a, DSP module 305a can determine the noise introduced into the test signal by transformer 208 and/or 212 by comparing the test signal after it has passed through transformer 208 and/or 210 with the original test signal.

Additionally, the test signal, whether generated by DSP module 305a or PSE controller 218, can be used to detect noise introduced by a combination of connectors 301 and 303 and transformers 220 and/or 224 onto the test signal. DSP module 305b can detect the output of the test signal from transformer 220 and/or 222 and can analyze it to determine how the combination of connectors 301 and 303 and transformers 220 and/or 224 altered the test signal. Alternatively, or in addition to this example, PD controller 228 can detect the test signal from center tap 220 and/or 224 and can analyze it to determine how the combination of connectors 301 and 303 altered the test signal.

DSP module 305b and/or PD controller 228 can generate a substantially similar test signal in a substantially similar manner as DSP module 305a and/or PSE controller 218 and can apply this test signal to center tap 220 and/or 224 to allow for measuring of noise introduced by transformers 220 and/or 224, a combination of connectors 301 and 303, and/or a combination of connectors 301 and 303 and transformers 208 and/or 212.

Thus, by using center taps 210, 214, 222, and 226 provided in a PoE subsystem, test signals can be introduced at multiple points in a PoE system to determine noise caused by individual system components. After the noise caused by the individual system components is determined, DSP module 305 at transceivers 202 and 219 can be used to compensate for the detected noise. For example, in an embodiment, transceivers 202 and 219 make an assumption about how much common mode to differential noise exists in PoE subsystem 100, and transceivers 202 and 219 can alter these assumptions after analyzing the noise introduced on the test signals. DSP modules 305a and 305b can be used to adjust for common mode to differential degradation in the signal. For example, if DSP module 305a determines that common mode signals create a higher differential for a positive signal than a negative signal, then DSP module 305b (and/or elements of the PoE subsystem, such as PSE controller 218) can be configured to compensate for this discrepancy. This discrepancy can become larger or smaller over time or as additional magnetic elements (e.g., additional transformers or connectors) are introduced into the system. For example, a common mode signal can initially cause a 2 mV difference per dB between the positive and negative differential signals, but this difference can grow to, for example, 10 mV per dB if another magnetic element is introduced into the system. Additionally, noise can be introduced from the entire channel including the entire cable assembly, including connectors, cabling, shielding, etc. By determining the amount of noise introduced by transformers 208, 212, 220, and/or 224, by connectors 301 and/or 303, and/or by possible additional noise sources, and by conducting periodic tests of the noise introduced by these elements, transceivers 202 and 219 can make better assumptions about the noise introduced by elements of PoE subsystem 100.

Common mode testing can be performed according to embodiments of the present disclosure regardless of whether the system is running and regardless of whether data is present on the line. For example, common mode testing in accordance with embodiments of the present disclosure can be performed in a diagnostic debug mode (e.g., during a test mode instead of during runtime). Additionally, common mode testing according to embodiments of the present disclosure can be performed during link negotiation.

A link partner (e.g., PSE 102 or PD 106) can report observations (e.g., an analysis of the observed noise caused by various magnetic elements) to another link partner in a variety of ways. For example, a link partner can report observations in packets using, for example, Link Layer Discovery Protocol (LLDP), physical layer signaling, or using another mechanism.

Coordination between transceivers 202 and 219 and PoE subsystems (e.g., PSE controller 218 and PD controller 228) can be done in hardware, software, or firmware in accordance with embodiments of the present disclosure. For example, in an embodiment, DSP modules 305*a* and 305*b* can be implemented using circuitry, software, or firmware. Additionally, in an embodiment, test signals can be generated by PSE controller 218 and PD controller 228 using circuitry, software, or firmware.

In an embodiment, test signals can be self-generated by PoE subsystem 100. For example, test signals can be self-generated by PoE subsystem 100 in response to a communicated command from a transceiver (e.g., transceiver 202 or 219), a host, firmware, and/or software. In an embodiment, PoE subsystem 100 and transceivers 202 or 219 are synchronized in time so that events can be observed (using, for example, a common system clock, a log of events that can be processed via DSP module 305*a*, the system host, firmware, and/or software).

Additionally, in an embodiment, noise observations can occur at one end only. For example, in an embodiment, PSE 102 may be able to generate and/or observe test signals, but PD 106 may not be able to generate and/or observe test signals. Additionally, in an embodiment, one end may be able to generate test signals, and another end may be able to observe them. For example, in an embodiment, PSE 102 can generate a test signal, and PD 106 can observe the test signal and communicate the observation to PSE 102.

4. Common Mode Testing in a System Using Dual Conductor Pairs

Figure 3B:
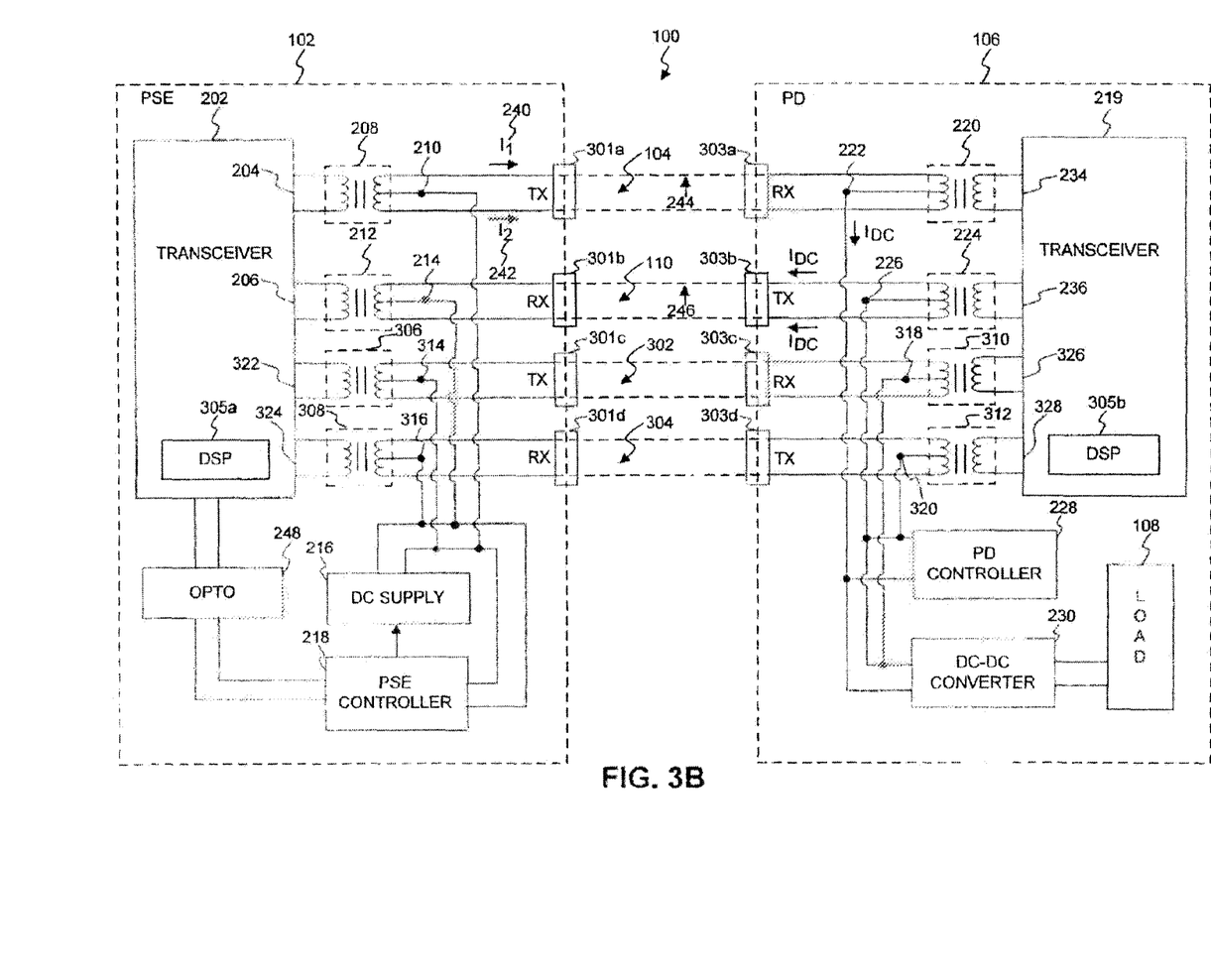
FIG. 3B is a block diagram of a PoE communications system using two conductor pairs that is configured to generate test signals in accordance with an embodiment of the present disclosure.

Embodiments of the present disclosure can operate using a variety of PoE standards. For example, embodiments of the present disclosure can operate according to PoE, PoE+ (802.3af and 802.3at, which are now part of 802.3-2012), and PoE++ (a future 4-pair PoE standard). While embodiments of the present disclosure are described above in reference to a PoE system with a single conductor pair, it should be understood that embodiments of the present disclosure can be used for common mode testing in PoE systems with any number of conductor pairs. FIG. 3B is a block diagram of a PoE communications system, using two conductor pairs, that is configured to generate test signals in accordance with an embodiment of the present disclosure.

In FIG. 3B, PSE 102 includes an additional differential transmit port 322 and differential receive port 324, and PD 106 includes an additional differential transmit port 326 and differential receive port 328. Another pair of conductors 302 and 304 are used to transmit additional communication signals. In an embodiment, these conductors are cables. Conductor 302 is coupled to connectors 301*c* and 303*c*, and conductor 304 is coupled to connectors 301*d* and 303*d*. These conductors 302 and 304 are coupled to transformers 306, 308, 310, and 312, and DC supply 216 and PSE controller 218 are used to supply power to transformers 306, 308, 310, and 312 via center taps 314, 316, 318, and 320.

DSP module 305*a* and/or PSE controller 218 can generate a test signal in a substantially similar manner as described above. DSP module 305*a* can detect the output of the test signal from transformers 208, 212, 306, and/or 308 and can analyze it to determine how transformers 208, 212, 306, and/or 308 altered the test signal in a substantially similar manner as described above. Additionally, the test signal, whether generated by DSP module 305*a* or PSE controller 218, can be used to detect noise introduced by a combination of connectors 301 and 303 and transformers 208, 212, 306, and/or 308 onto the test signal in a substantially similar manner as described above.

DSP module 305*b* and/or PD controller 228 can generate a substantially similar test signal in a substantially similar manner as DSP module 305*a* and/or PSE controller 218 and can apply this test signal to center taps 220, 224, 310 and/or 312 to allow for measuring of noise introduced by transformers 220, 224, 310, and/or 312, a combination of connectors 301 and 303, and/or a combination of connectors 301 and 303 and transformers 220, 224, 310, and/or 312.

5. Methods

Figure 4:
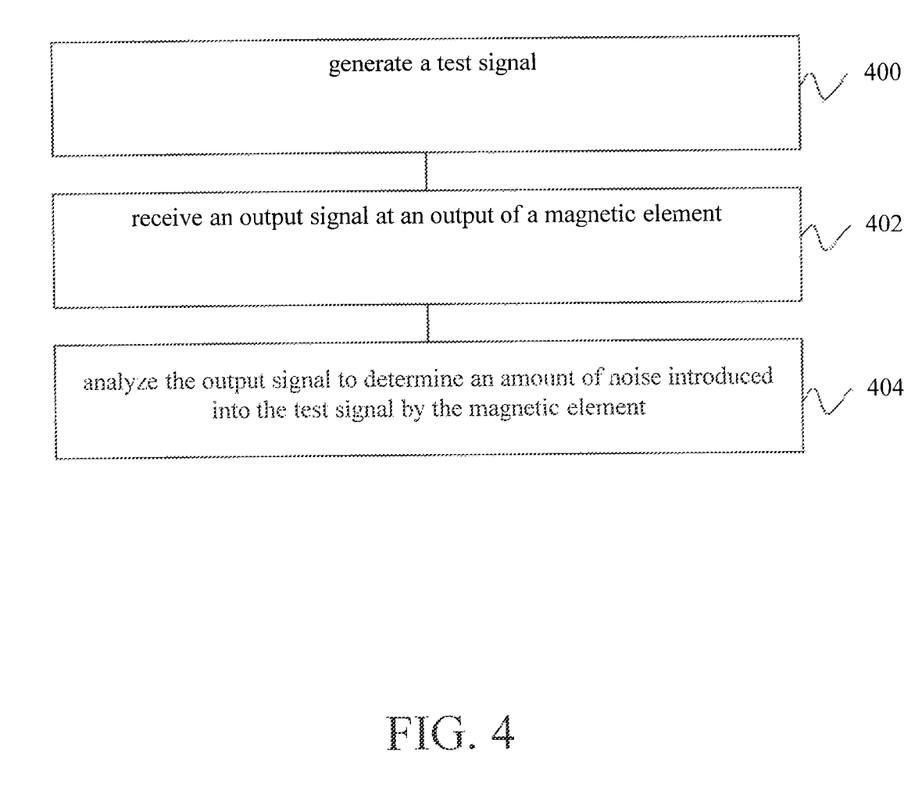
FIG. 4 is a flowchart of a method for detecting noise introduced in a system in accordance with an embodiment of the present disclosure.

FIG. 4 is a flowchart of a method for detecting noise introduced in a system in accordance with an embodiment of the present disclosure. In step 400, a test signal is generated. For example, DSP module 305*a* can generate a test signal and can transmit this test signal over transformer 208 via center tap 210. In step 402, an output signal is received at an output of a magnetic element. For example, PSE controller 218 can receive a modified version of the test signal at an output of transformer 208. In step 404, the output signal is analyzed to determine an amount of noise introduced into the test signal by the magnetic element. For example, PSE controller 218 can analyze the signal output from transformer 208 to determine how much noise was introduced into the test signal by transformer 208. This information can then be sent to transceiver 202 and/or transceiver 219 so that transceiver 202 and/or transceiver 219 can compensate for this added noise.

The above procedure can be repeated to test the amount of noise introduced by any number of magnetic elements of a system. Using the method of FIG. 4, test signals can be input into magnetic elements, and output signals can be detected at the outputs of these magnetic elements, and the noise introduced by the magnetic elements can be analyzed so that transceivers 202 and 219 can compensate for this added noise. For example, using the method of FIG. 4, the amount of noise added by each of transformers 208, 220, 212, and 224 and the amount of noise added by connectors 301 and 303 can be detected.

By introducing test signals at various points in a system (e.g., a 10GBASE-T system), the source of common mode noise introduced into the system can be more accurately determined, and transceivers 202 and 219 can make better assumptions about the amount of noise expected in the system. If these tests are periodically conducted, transceivers 202 and 219 can compensate for variations in the amount of noise introduced by magnetic elements as time progresses and/or as more elements are added to the system.

6. Other Embodiments

While embodiments of the present disclosure are described with reference to PoE systems, it should be understood that embodiments of the present disclosure can be used to detect noise caused by system components in a variety of Ethernet systems. For example, in an embodiment, it is not necessary for an Ethernet system to be powered to determine noise introduced by individual system components (e.g., by transformers 208, 220, 212, and/or 224 and/or connectors 301 and/or 303). In an embodiment, center taps 210, 214, 222, and 226 can be introduced in a non-powered Ethernet system, and transceivers 202 and 219 (or a controller) can be used to generate and detect test signals at center taps 210, 214, 222, and/or 226 to determine the noise introduced by the individual system components. For example, in an embodiment, transceivers 202 and 219 can access the pins of center taps 210, 214, 222, and 226 directly via an isolator and/or a field-programmable gate array (FPGA).

Figure 5A:
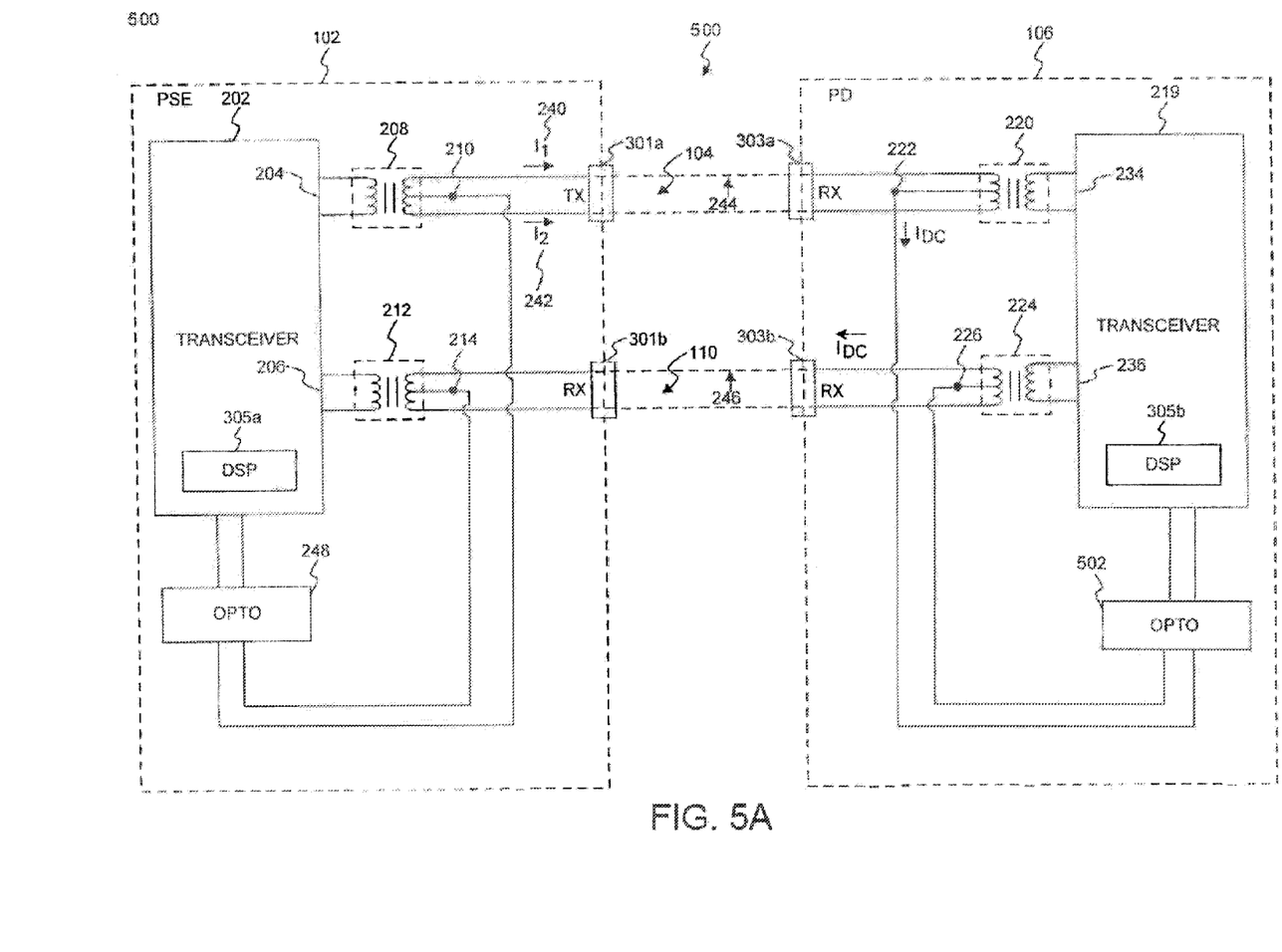
FIG. 5A is a block diagram of a 10GBASE-T system configured to generate test signals in accordance with an embodiment of the present disclosure.

FIG. 5A is a block diagram of a 10GBASE-T system configured to generate test signals in accordance with an embodiment of the present disclosure. While embodiments of the present disclosure are described in FIG. 5A with respect to a 10GBASE-T system, it should be understood that embodiments of the present disclosure are applicable to a variety of systems that can operate according to one or more of a variety of networking standards. Embodiments of the present disclosure can operate according to other BASE-T standards, such as standards for 40GBASE-T and higher speeds, and/or non-standard speeds. For example, embodiments of the present disclosure can operate according to 10BASE-T, 100BASE-TX, 1000BASE-T standards, and embodiments of the present invention can be used with future higher-speed standards, such as standards for 40GBASE-T, 100GBASE-T, and/or 400GBASE-T. Additionally, it should be understood that embodiments of the present disclosure can apply to systems operating asymmetrically (e.g., a system where one transceiver is communicating at 10G and the other transceiver is communicating at another speed).

A variety of cables can be used according to embodiments of the present disclosure. For example, embodiments of the present disclosure can be used with Category (Cat) 5, Cat 5e, Cat 6, Cat 6A, Cat 7, Cat 7A, Cat 8, and/or Cat 8A cables. It should also be understood that other cables, including cables with possible future enhancements, can be used with embodiments of the present disclosure. Additionally, it should be understood that embodiments of the present disclosure can be used with both shielded (screened) and unshielded cables.

In FIG. 5A, center taps 210 and 214 are coupled to isolator 248, which is coupled to transceiver 202. Center taps 222 and 226 are coupled to isolator 502, which is coupled to transceiver 219. In an embodiment, DSP module 305a of transceiver 202 generates a test signal and sends the test signal across isolator 248 to center taps 210 and/or 214, where it is routed throughout 10GBASE-T system 500. This test signal can be used to detect noise introduced by transformer 208 and/or transformer 212 onto the test signal. DSP module 305a can detect the output of the test signal from transformers 208 and/or 212 and can analyze it to determine how transformer 208 and/or transformer 212 altered the test signal. For example, DSP module 305a can compare the test signal after it has passed through transformer 208 and/or transformer 212 with the original test signal.

Additionally, the test signal can be used to detect noise introduced by a combination of connectors 201 and 303 and transformers 220 and/or 224 onto the test signal. DSP module 305b can detect the output of the test signal from transformers 220 and/or 222 and can analyze it to determine how the combination of connectors 301 and 303 and transformers 220 and/or 224 altered the test signal.

DSP module 305b can generate a substantially similar test signal in a substantially similar manner as DSP module 305a and can apply this test signal to center taps 220 and/or 224 to allow for measuring of noise introduced by transformers 220 and/or 224, a combination of connectors 301 and 303, and/or a combination of connectors 301 and 303 and transformers 208 and/or 212.

Figure 5B:
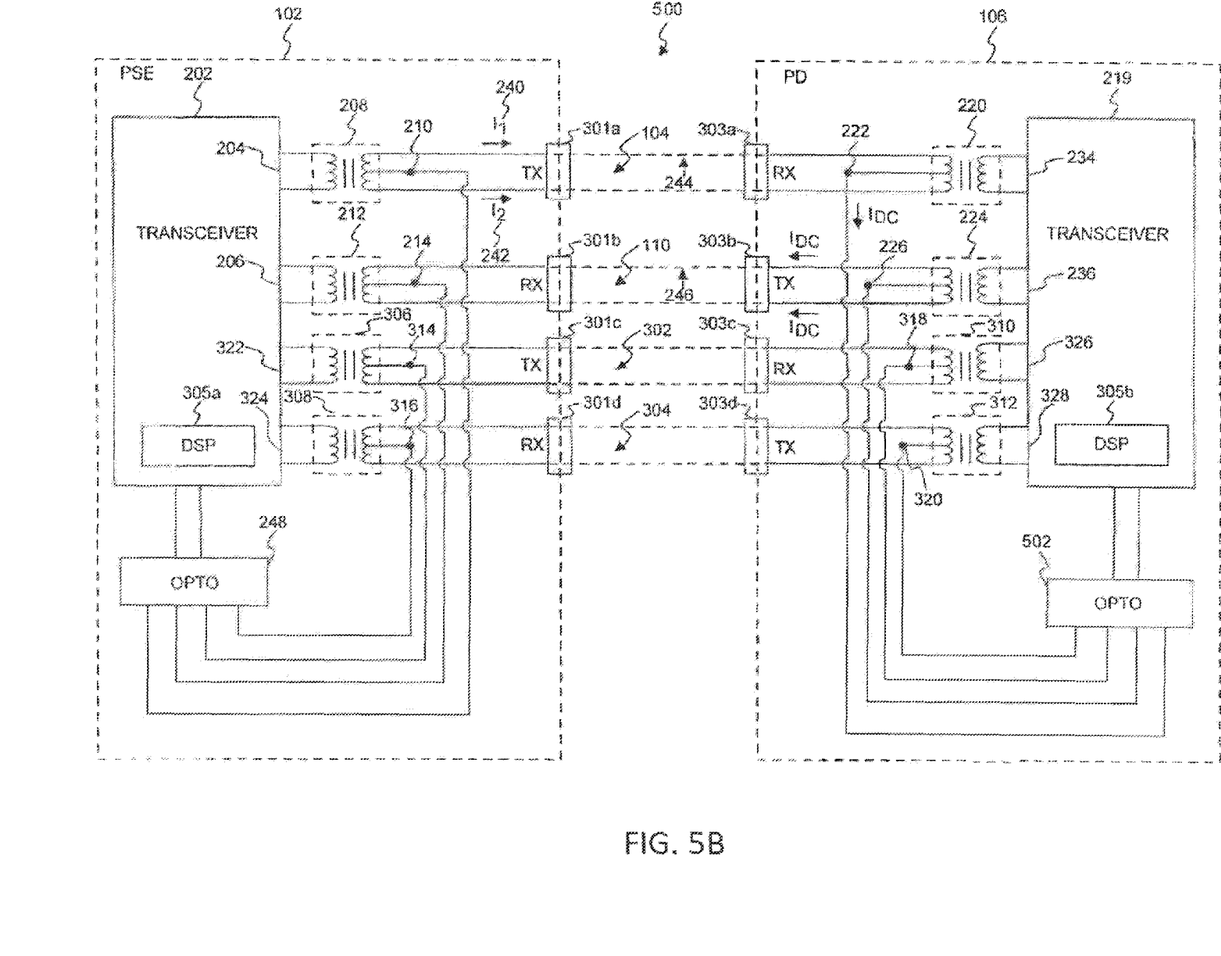
FIG. 5B is a block diagram of a 10GBASE-T system using two conductor pairs that is configured to generate test signals in accordance with an embodiment of the present disclosure.

FIG. 5B is a block diagram of a 10GBASE-T system using two conductor pairs that is configured to generate test signals in accordance with an embodiment of the present disclosure. In FIG. 5B, DSP modules 305a and 305b can introduce test signals at center taps 210, 214, 314, 316, 222, 226, 318, and/or 320. Using these test signals, DSP modules 305a and 305b can determine the amount of noise introduced into the test signals by transformers 208, 212, 306, 308, 220, 224, 310, and/or 312 and/or connectors 301 and 303.

7. Conclusion

It is to be appreciated that the Detailed Description, and not the Abstract, is intended to be used to interpret the claims. The Abstract may set forth one or more but not all exemplary embodiments of the present disclosure as contemplated by the inventor(s), and thus, is not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The representative signal processing functions described herein can be implemented in hardware, software, or some combination thereof. For instance, the signal processing functions can be implemented using computer processors, computer logic, application specific circuits (ASIC), digital signal processors, etc., as will be understood by those skilled in the art based on the discussion given herein. Accordingly, any processor that performs the signal processing functions described herein is within the scope and spirit of the present disclosure.

The above systems and methods may be implemented as a computer program executing on a machine, as a computer program product, or as a tangible and/or non-transitory computer-readable medium having stored instructions. For example, the functions described herein could be embodied by computer program instructions that are executed by a computer processor or any one of the hardware devices listed above. The computer program instructions cause the processor to perform the signal processing functions described herein. The computer program instructions (e.g. software) can be stored in a tangible non-transitory computer usable medium, computer program medium, or any storage medium that can be accessed by a computer or processor. Such media include a memory device such as a RAM or ROM, or other type of computer storage medium such as a computer disk or CD ROM. Accordingly, any tangible non-transitory computer storage medium having computer program code that cause a processor to perform the signal processing functions described herein are within the scope and spirit of the present disclosure.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, and further the invention should be defined only in accordance with the following claims and their equivalents.

What is claimed is:

1. A system, comprising:
a first transceiver, coupled to a first transformer, configured to generate a first test signal to be applied to a center tap of the first transformer;
a first controller, coupled to the first transformer, configured to:
receive a first output signal generated by the first transformer, and
analyze the first output signal to determine a first amount of noise introduced into the first test signal by the first transformer; and
a first connector coupled to the first transformer and to the first controller, wherein the first test signal is transmitted over a conductor coupled to the first connector when applied to the center tap of the first transformer.

2. The system of claim 1, wherein the system is a 10GBASE-T Ethernet system.

3. The system of claim 1, wherein the first controller is a Power Source Equipment (PSE) controller or a Powered Device (PD) controller.

4. The system of claim 1, wherein the first controller is further configured to:
receive a second output signal from the first connector, and
analyze the second output signal to determine a second amount of noise introduced into a second test signal by the first connector.

5. The system of claim 1, wherein the first transceiver is further configured to send a message indicating the first amount of noise to a second transceiver in communication with the first transceiver.

6. The system of claim 1, further comprising:
a conductor coupled to the first connector;
a second connector coupled to the conductor;
a second transformer coupled to the second connector;
a second transceiver coupled to the second transformer; and
a second controller coupled to the second transformer.

7. The system of claim 6, wherein the first controller is configured to generate a second test signal, and wherein the second controller is configured to:
receive a second output signal from the second connector; and
analyze the second output signal to determine a second amount of noise introduced into the second test signal by the second connector.

8. The system of claim 6, wherein the second controller is configured to generate a second test signal, and wherein the second transceiver is configured to:
detect a second output signal generated by the second transformer; and
analyze the second output signal to determine a second amount of noise introduced into the second test signal by the second transformer.

9. The system of claim 1, wherein the first transceiver comprises:
a digital signal processing (DSP) module, wherein the DSP module is configured to:
receive information regarding the first amount of noise; and
compensate for the first amount of noise.

10. A system, comprising:
a first magnetic element;
a first transceiver coupled to the first magnetic element, wherein the first transceiver is configured to:
generate a first test signal,
receive a first output signal generated by the first magnetic element, and
analyze the first output signal to determine a first amount of noise introduced into the first test signal by the first magnetic element; and
a connector coupled to the first magnetic element, wherein the first test signal is transmitted over a conductor coupled to the connector when applied to a center, tap of the first magnetic element.

11. The system of claim 10, wherein the first transceiver is further configured to:
generate a second test signal, and
transmit the second test signal over the conductor.

12. The system of claim 10, wherein the first transceiver is further configured to:
receive a second output signal from the connector, and
analyze the second output signal to determine a second amount of noise introduced into a second test signal by the connector.

13. The system of claim 10, wherein the first transceiver is further configured to send a message indicating the first amount of noise to a second transceiver in communication with the first transceiver.

14. The system of claim 10, further comprising:
a second transceiver in communication with the first transceiver, wherein the second transceiver is coupled to a second magnetic element, and wherein the second transceiver is configured to:
receive a second output signal generated by the second magnetic element, and
analyze the second output signal to determine a second amount of noise introduced into a second test signal by the second magnetic element.

15. A method for detecting noise introduced into a system, the method comprising:
generating, at a first transceiver, a first test signal;
receiving, at an output of a first magnetic element, a first output signal;
analyzing the first output signal to determine a first amount of noise introduced into the first test signal by the first magnetic element;
generating a second test signal;
receiving, at an output of a second magnetic element, a second output signal; and
analyzing the second output signal to determine a second amount of noise introduced into the second test signal by the second magnetic element.

16. The method of claim 15, further comprising:
receiving a third output signal from a connector coupled to a conductor; and
analyzing the third output signal to determine a second amount of noise introduced into a second test signal by the connector.

17. The method of claim 15, further comprising:
communicating a message indicating the first amount of noise to a second transceiver in communication with the first transceiver.

18. A system, comprising:
a transformer;
a connector coupled to the transformer; and
a transceiver, coupled to the transformer, wherein the transceiver is configured to:
generate a test signal to be applied to a center tap of the transformer,
receive a first output signal generated by the transformer,
receive a second output signal from the connector,
determine, based on the test signal and the first output signal, whether the transformer is a source of noise in the system, and
determine, based on the test signal, the first output signal, and the second output signal, whether the connector is the source of noise in the system.

19. The system of claim 18, wherein the first output signal is a differential signal comprising a positive signal and a negative signal, and wherein the transceiver is further configured to:
determine a difference between the positive signal and the negative signal; and
determine, based on the difference, whether the transformer is the source of noise in the system.

20. The system of claim 18, wherein the transceiver is further configured to:
analyze the first output signal to determine a first amount of noise introduced into the test signal by the transformer.

21. The system of claim 18, wherein the transceiver is further configured to send a message indicating an amount of noise generated by the transformer to a second transceiver in communication with the transceiver.

* * * * *